(12) United States Patent
Kaiser

(10) Patent No.: US 8,847,417 B2
(45) Date of Patent: Sep. 30, 2014

(54) COMBINATION HEATER AND ELECTRICAL GENERATOR SYSTEM AND RELATED METHODS

(75) Inventor: Stewart Kaiser, Boca Raton, FL (US)

(73) Assignee: Everlite Hybrid Industries, LLC, Boca Raton, FL (US)

(*) Notice: Subject to any disclaimer, the term of this patent is extended or adjusted under 35 U.S.C. 154(b) by 304 days.

(21) Appl. No.: 13/445,056

(22) Filed: Apr. 12, 2012

(65) Prior Publication Data

US 2012/0256419 A1 Oct. 11, 2012

Related U.S. Application Data

(63) Continuation-in-part of application No. 12/824,857, filed on Jun. 28, 2010, now Pat. No. 8,590,605, which is a continuation-in-part of application No. 12/760,256, filed on Apr. 14, 2010, now Pat. No. 8,511,073.

(51) Int. Cl.
*F01K 15/00* (2006.01)

(52) U.S. Cl.
USPC .............................................................. 290/2

(58) Field of Classification Search
USPC ................................ 290/1 A, 2; 165/163, 157
See application file for complete search history.

(56) References Cited

U.S. PATENT DOCUMENTS

| | | | | |
|---|---|---|---|---|
| 4,739,180 | A * | 4/1988 | Yanoma et al. | 290/2 |
| 5,937,652 | A * | 8/1999 | Abdelmalek | 60/648 |
| 6,237,337 | B1 * | 5/2001 | Bronicki et al. | 60/641.12 |
| 7,062,913 | B2 * | 6/2006 | Christensen et al. | 60/651 |
| 8,482,152 | B1 * | 7/2013 | Stahlkopf et al. | 307/43 |
| 8,511,073 | B2 * | 8/2013 | Kaiser | 60/298 |
| 8,590,605 | B2 * | 11/2013 | Kaiser | 165/163 |
| 2006/0288720 | A1 * | 12/2006 | Jmaev | 62/236 |

* cited by examiner

*Primary Examiner* — Nicholas Ponomarenko
(74) *Attorney, Agent, or Firm* — Allen, Dyer, Doppelt, Milbrath & Gilchrist, P.A.

(57) ABSTRACT

The invention is directed to a combination heater and electrical generator designed to allow continual use of the heating system in the absence of an external source of electricity. The system shares fuel and electrical inputs and also shares exhaust outputs so to facilitate ease of use installation as well as affording a small installation footprint.

21 Claims, 9 Drawing Sheets

COMBINATION HEATER AND ELECTRICAL GENERATOR SYSTEM AND RELATED METHODS

CROSS-REFERENCE TO RELATED APPLICATION

This application is a Continuation in Part of pending U.S. patent application Ser. No. 12/824,857 filed on Jun. 28, 2010 entitled "Heat Exchange Module for Cogeneration Systems and Related Method of Use," which in turn is a Continuation in Part of pending U.S. patent application Ser. No. 12/760,256 filed on Apr. 14, 2010 entitled "High Efficiency Cogeneration System and Related Method of Use," the contents of which are incorporated by reference herein.

FIELD OF THE INVENTION

This invention is directed toward an integrated backup electrical generator and heating system designed allow continual use of the heating system in the absence of an external source of electricity, the system sharing fuel and electrical inputs and sharing exhaust output so to facilitate ease of installation.

BACKGROUND OF THE INVENTION

Cogeneration represents a relatively new concept in the field of generating electricity. Traditionally, electricity has been created by centralized facilities—typically through burning a fossil fuel like coal—which is then transported through an electrical grid to individual residential and commercial facilities.

Within the past several years, cogeneration systems have been developed to essentially reduce both need and reliance on these electrical grids. More specifically, cogeneration systems typically employ a heat engine (typically an internal combustion engine) or a power station located in proximity to the residential or commercial facilities it serves so to simultaneously generate both electricity and useful heat. Most cogeneration systems utilize a centralized reservoir of fossil fuel to create electricity, heat running water and air, and in some instances even provide energy back into the grid for credit.

Recently, there have been several forms of cogeneration systems developed for use in residential homes and smaller commercial facilities. These systems have been dubbed "mini-cogeneration" systems due to their modest size and performance. Another common name associated with these systems is a distributed energy resource ("DER") system.

Regardless of the moniker, these systems produce usually less than 5 kW of power. Instead of burning fuel to merely heat space or water, some of the energy is converted to electricity in addition to heat. This electricity can be used within the home or business, and if permitted by municipal grid management entities may be sold back to the municipal electricity grid. A recent study by the Claverton Energy Research Group found that such a cogeneration system offered the most cost effective means of reducing $CO_2$ emissions—even compared to use of photovoltaic devices for the production of energy.

Apart from the energy conservation associated with mini-cogeneration systems, the technology also offers additional logistical benefits. Such cogeneration systems often offer more reliable energy solutions to residential dwellings in rural areas wherein it is difficult access the electrical grid. Alternatively, these systems offer more stable energy supplies in areas often affected by natural disasters such as hurricanes, tornadoes and earthquakes—where the downing of power lines will often lead to large periods with a lack of energy.

While there exists multiple benefits for micro-cogeneration systems, they currently possess several drawbacks. First, current cogeneration systems still create a certain degree of byproduct from the burning of fossil fuels that must be released into the atmosphere. This creates a secondary safety issue as there is a risk that unless this toxic byproduct is sufficiently vented that it could cause a build up of carbon monoxide within the residence. Second, most of the heat engines used in micro-cogeneration systems are not highly efficient, resulting in the waste of expensive fossil fuels. Finally, many cogeneration systems fail to adequately harvest all much of the heat byproduct created from the heat engines, which could be used to heat air and water to be used throughout a facility.

Under normal conditions, residential heating systems require the use of electricity. Even when the main source of combustion is a fossil fuel, such as oil, natural gas, or propane there is almost always a need for electricity to at least power an air blower motor, power water pumps in a boiler unit, or to provide power to a transformer and igniter in a steam unit.

In the case of a power failure during the winter months, homes and homeowners can potentially be in a considerable amount of danger. Water pipes can freeze in only a few hours in the absence of an internal heat source. Additionally, the temperature within the home can rapidly fall to dangerously low levels, placing homeowners in peril.

Portable gasoline generators—normally for the purpose of providing power to lights and appliances during a power outage—are not typically equipped or installed to provide power to heat-providing sources.

Additionally, in warmer months, tropical storms, lightning, power blackouts due to overloaded power grids, and other phenomenon cause residences to lose electrical power. The loss of television, fan, lights, refrigerators, and other appliances is an inconvenience, if not dangerous. During widespread losses in electricity, pumping gasoline for use in a generator is difficult for most gas pumps rely on electric power to operate.

Most natural gas sources operate during loss of electrical power. Installing a natural gas or propane automatic generator, which is wired to a home's breaker or fuse panel, could prevent all the above mentioned problems. Such installations however require extremely expensive equipment, the installation of gas pipes, new electrical connections, and in most applications are extremely expensive upgrades.

Air-cooled fossil fuel generators produce a substantial amount of heat and exhaust under normal operation, yet are designed to operate outdoors where there is sufficient air available for cooling and exhaust discharge. Attempting to operate a generator within a confined environment is met with a significant amount of mechanical challenges, including cooling and discharging heat and exhaust gasses in a safe manner.

Accordingly, there is a need in the field for a highly efficient electricity generation system wherein an indoor generator is easily and cost effectively integrated with an existing furnace or boiler to provide seamless backup power to a facility and provide a means for a fuel-powered heating system to operate. Such a system should comprise a scheme for extracting generator exhaust gasses in a safe and efficient manner that is additionally cost effective to implement.

Finally, such improved system should preferably be compact, self-contained and easy to use.

SUMMARY OF THE INVENTION

It is therefore an object of the present invention to provide an integrated electrical generator and heating system comprising a heating apparatus for the purpose of providing heat to an interior space that comprises a fuel burner that produces heat, a heat exchanger that is heated by the burner, a draft inducer to promote an influx of combustion air and exhausting of exhaust gas created by the burner, and a flue in communication with the draft inducer. The flue defines the path for the heating apparatus exhaust gas to escape from the system. The flue is made from a material chosen from the group comprising one or more of the following materials: polyvinyl chloride, metal, vitreous enamel, transite, and other materials known in the art. The heater fuel input line is in communication with the burner to provide fuel to the burner. The heating apparatus is at least one of a furnace, boiler, and electric element heater, and provides heat through intermediary fluid movement, the fluids chosen from the group consisting of air, steam, and water.

The integrated electrical generator and heating system also comprises a fuel-powered electrical generator including an electrical input, a first electrical output, a generator fuel input line, an air intake conduit, and an exhaust conduit. The generator accepts electrical service from an electrical power grid through the electrical input. The generator delivers electricity to the heating apparatus through the first electrical output. The generator accepts the air required for combustion through the intake conduit, and exhausts combustion exhaust gases through the exhaust conduit, wherein the exhaust conduit of the generator communicates with the flue of the heating apparatus.

The generator utilizes a fuel to generate electricity chosen from the group comprising natural gas, liquefied petroleum gas, fuel oil, coal, and wood. The generator generates at least one of 120 VAC single-phase power, 240 VAC single-phase power, 240 VAC three-phase power, and 480 VAC three-phase power.

The integrated electrical generator and heating system additionally comprises at least one normally closed relay that communicates electrical service from the power grid to the first electrical output when the generator is powered off. The relay communicates electricity generated by the generator to the first electrical output when the generator is powered on. An electrical exhaust gas relay is activated by the generator when the generator is generating power and signals the exhaust gas relay to signal the draft inducer to activate so that the draft inducer can generate a vacuum to evacuate at least one of generator exhaust gas and heating apparatus exhaust gas from the system.

Additionally, a second electrical output communicates with at least one electrical power receptacle, and at least one normally closed relay communicates electrical service from the power grid to the second electrical output when the generator is powered off. The relay communicates electricity generated by the generator to the second electrical output when the generator is powered on. The exhaust conduit of the generator communicates with the flue of the heating apparatus using a Y-pipe.

A housing encases the generator that has an emergency leak conduit in communication with the exhaust conduit of the generator and at least one intake port on the housing. Also at least one fan is proximate the leak conduit port, the fan being activated when the generator is powered on to create a negative pressure within the housing causing air external to the housing to enter into the housing through the intake port.

A pressure switch communicates with the heating apparatus proximate the flue and also communicates with the generator, wherein the pressure switch detects a negative pressure induced by the draft inducer and disables the generator when the draft inducer is not functional.

The fuel to power the heating apparatus is of the same type of fuel to power the generator, and the heater fuel input line communicates with the generator fuel input line and both the heating apparatus and generator share a common source of fuel.

A heat exchange module for employing usable heat created by a cogeneration system coupled to a generator is also contemplated in this disclosure. This cogeneration system is coupled to a generator and comprises a heating apparatus for the purpose of providing heat to an interior space. The heating apparatus comprises a fuel burner that produces heat, a heat exchanger that is heated by the burner, a draft inducer to promote an influx of combustion air and exhausting of exhaust gas created by the burner, and a flue in communication with the draft inducer. The flue is a path for the heating apparatus exhaust gas to escape from the system, and a heater fuel input line in communication with the burner to provide fuel to the burner.

Additionally, this embodiment of the invention comprises a fuel-powered electrical generator including an electrical input, a first electrical output, a generator fuel input line, an air intake conduit, and an exhaust conduit. The generator accepts electrical service from an electrical power grid through the electrical input, and the generator delivers electricity to the heating apparatus through the first electrical output. The generator accepts air required for combustion through the intake conduit and exhausts combustion exhaust gas through the exhaust conduit. At least one normally closed relay communicates electrical service from the power grid to the first electrical output when the generator is powered off, and the relay communicates electricity generated by the generator to the first electrical output when the generator is powered on. An electrical exhaust gas relay is activated by the generator when the generator is generating power, and signals the draft inducer to activate. The draft inducer generates a vacuum that evacuates at least one of generator exhaust gas and heating apparatus exhaust gas from the system. A second heat exchanger having a collection chamber and at least one heat exchange conduit captures the generator's exhaust gas for the purpose of heating at least one heat exchange conduit. The heat exchange conduit contains water that is heated by the heat exchange conduit. The heated water in the heat exchange conduit is used as water for at least one of a water heater and a radiant heating system. It should be noted that all of the embodiments of the integrated electrical generator and heating system described above are applicable as embodiments of the heat exchange module for employing usable heat created by a cogeneration system coupled to a generator.

BRIEF DESCRIPTION OF THE DRAWINGS

For a fuller understanding of the invention, reference is made to the following detailed description, taken in connection with the accompanying drawings illustrating various embodiments of the present invention, in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Positioning and Location of Cogeneration System

Figure 1:
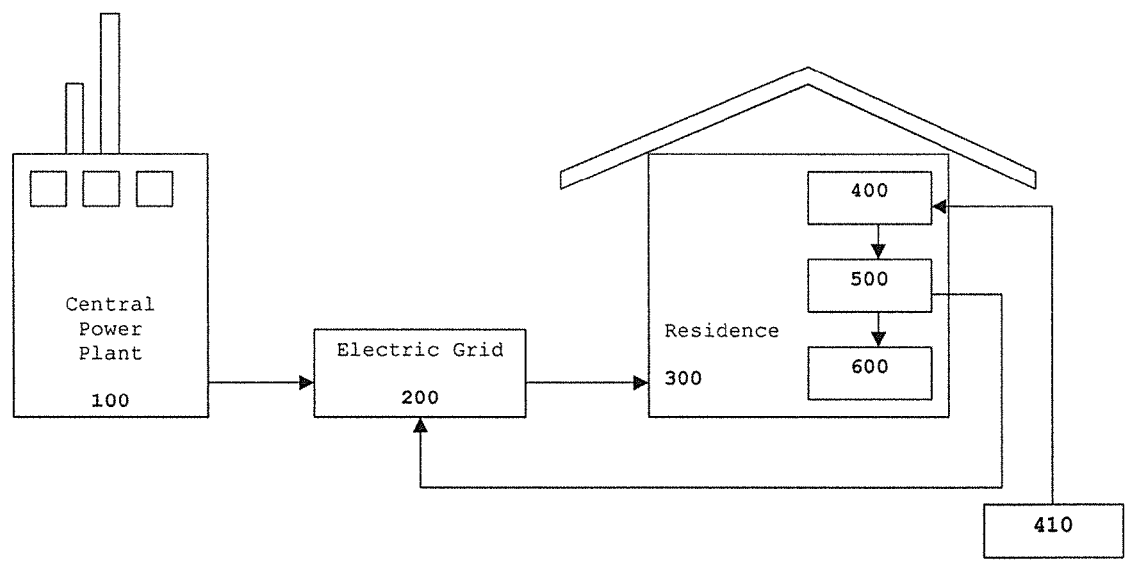
FIG. 1 is a schematic illustrating the overall positioning of the cogeneration system in light of the electricity grid.
Figure 2:
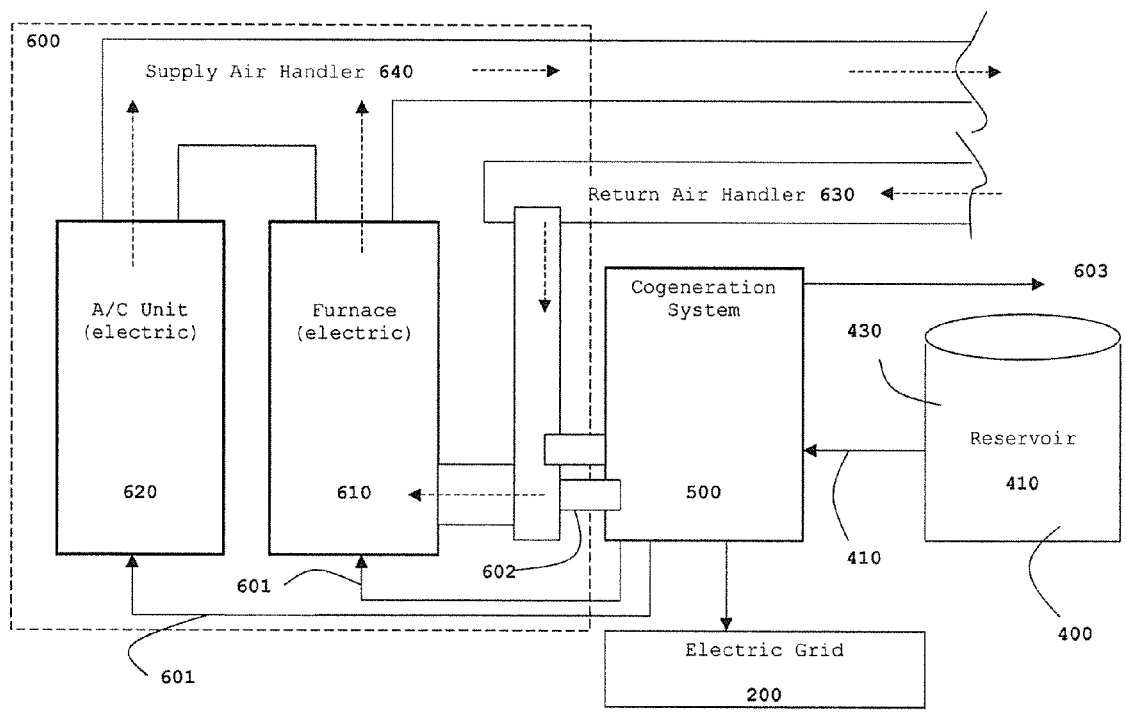
FIG. 2 is a diagram illustrating placement of the cogeneration system and various connections with the existing furnace, air-conditioning and air handlers.

FIG. 1 and FIG. 2 both illustrate, by way of example, one positioning and location of the preferred cogeneration system 500. FIG. 1 provides a general illustration of a conventional centralized power generation system. Here, a central power plant 100 generates electricity for disbursement to a plurality of various residential and commercial facilities 300 throughout a distinct geographic area. Such central power plant 100 can create electricity through an energy source 430, such as conventional burning of fossil fuels (typically coal) through nuclear energy or harnessing geothermal energy.

Positioned between the central power plant 100 and the residential or commercial facility 300 is the electric grid 200. This electric grid 200 consists of various transformers, power stations and power lines that transport electricity from the central power plant 100. This electricity is then supplied to residential or commercial facilities 300 for use.

When a residential or commercial facility employs the invention, it must also include various components to properly service the overall apparatus. This includes a fuel source 400 that supplies a sufficient amount and quantity of energy to the cogeneration system 500. Such fuel source 400 may include, but is certainly not limited to, a reservoir 410 of fossil fuels, such as petroleum, oil, propane, butane, ethanol, natural gas, liquid natural gas (LNG) or fuel oil. Alternatively, the fuel source 400 may alternatively be a fuel line 420 such as a natural gas or propane line supplied by a municipality. Regardless, either fuel source 400 must supply sufficient energy to power the cogeneration system 500—which in turn can create electricity and usable heat for the furnace 600 and other appliances.

FIG. 1 also illustrates how the cogeneration system 500 can supply energy back to the electricity grid 200 for credits. This occurs when the cogeneration system 500 supplies a greater level of energy than required by the facility 300. While FIG. 1 shows the placement of the cogeneration system in light of the electric grid 200, FIG. 2 shows the interconnectivity within the residential facility 300 itself. As illustrated, an energy source 430 stored within a reservoir 410 (or fed by a fuel line 420) is supplied to the cogeneration system 500. Spending of this energy source 430 within the cogeneration system 500 creates two forms of energy: electricity 601 and usable heat 602. The electricity 601 can provide energy to the residential facility 300, as well as power both the furnace 610 and the air-conditioning unit 620. Alternatively, the furnace 610 can be supplied energy directly from the reservoir 410.

In addition, usable heat 602 created by the cogeneration system 500 can be used to heat air from a return air handler 630 prior to being introduced into the furnace 610 for heating. By doing so, the system essentially pre-heats the incoming cooler air prior to being warmed by the furnace 610, which in turn requires less energy (and results in less strain on the furnace 610). This is one of many forms of energy conservation contemplated by the invention.

Once heated air leaves the furnace 610, it is positioned within a supply air handler 640 to be circulated throughout the residential facility 300. Alternatively, when cooler air is desired, the convention contemplates having the air conditioning unit 620 supply cooler air to the supply air handler 640. As such, the apparatus taught by the invention requires interplay and interconnectivity between the cogeneration system 500, the furnace 610, the air conditioning unit 620 and both air handlers 630 and 640 to ensure efficient cooling and heating of air circulated throughout the home.

The Cogeneration System

Figure 3:
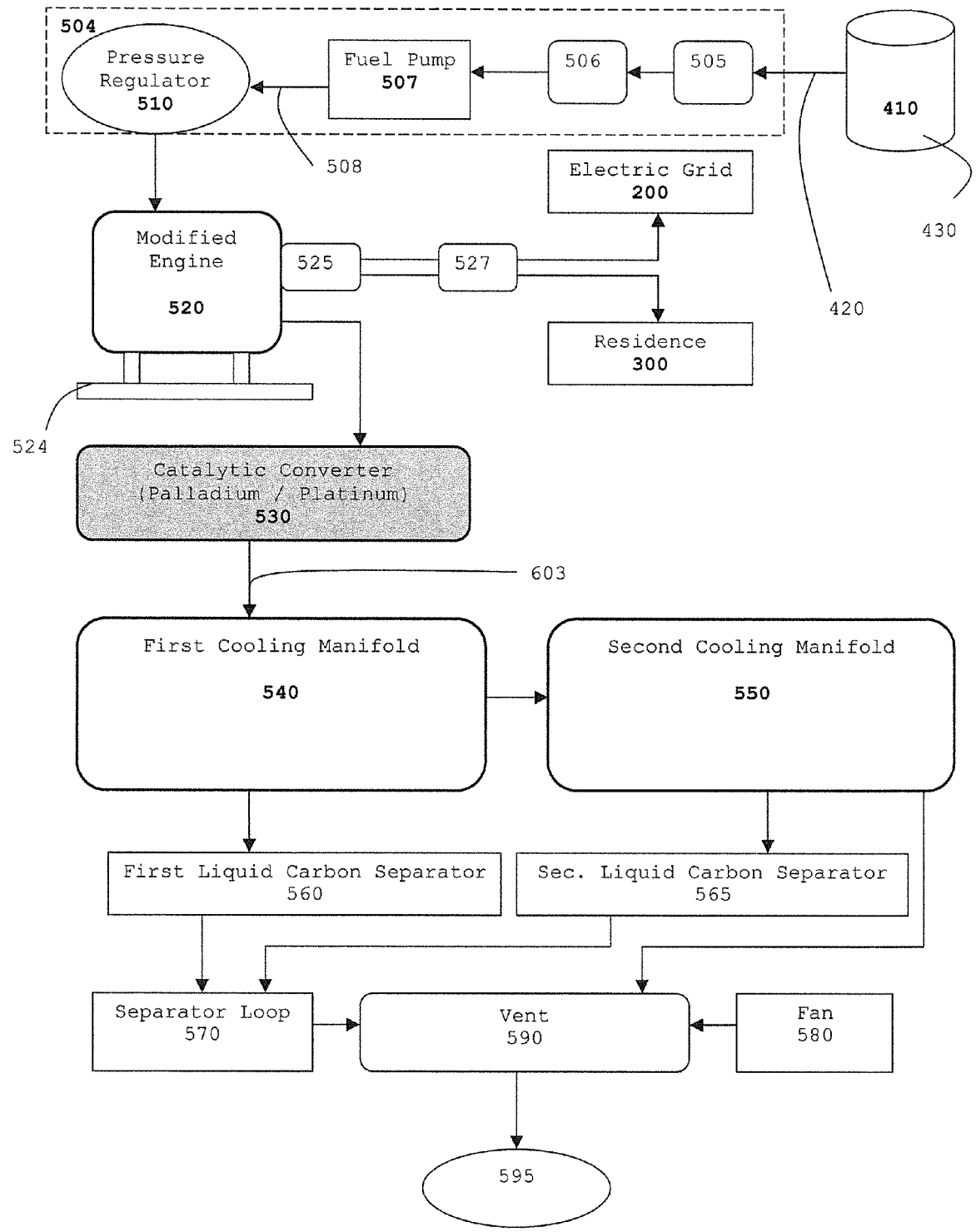
FIG. 3 illustrates the primary components of the cogeneration system including the catalytic converter and cooling manifolds.

FIG. 3 illustrates, by way of example, the components that make up the cogeneration system 500. As shown, the primary components of the apparatus include a reservoir 410 capable of housing an energy source 430 (which can be a fossil fuel), a regulator system 504, a modified combustion engine 520 (hereinafter referred to simply as a "modified engine"), a catalytic converter 530, and two cooling manifolds 540 and 550 which help treat the various hot gasses 603 which form as byproduct from the modified engine 520. Other additional or substitute components will be recognized and understood by those of ordinary skill in the art after having the benefit of the foregoing disclosure.

As illustrated in FIGS. 2 and 3, the first component of the cogeneration system 500 is the fuel source 400, which can be a reservoir 410 (or alternatively a fuel line 420). The reservoir 410 is of a size and dimension to provide a sufficient amount and quantity of an energy source 430 to fuel the cogeneration system 500 for a defined period of time preferably thirty days. Moreover, the reservoir 410 is designed to maintain a variety of fossil fuels including petroleum, natural gas, propane, methane, ethanol, biofuel, fuel oil or any similar and related fuel known and used to create energy via combustion. The reservoir 410 is typically housed outside of the residential facility 300 for safety and aesthetics.

Regardless of the type, the energy source 430 is drawn out of the reservoir 410 and treated for injection into the modified engine 520 through a regulator system 504. This regulator system 504 ensures that the energy source 430 is fed to the modified engine 520 at a specific pressure and flow rate—regardless of the outside temperature, pressure or weather conditions. Because the cogeneration system 500 will be employed in a variety of conditions from low lying areas to the mountains, in tropical climates to arctic regions, the regulator system 504 must be self-regulating, robust and capable of handling large swings in weather conditions.

As illustrated in FIG. 3, the regulator system 504 includes four primary components: two fuel valves 505 and 506, a fuel pump 507 and a pressure regulator 510. Other related and additional components will be recognized and understood by those of ordinary skill in the art upon review of the foregoing. The energy source 430 is drawn from the reservoir through the fuel pump 507 for transport into the modified engine 520.

Positioned between the reservoir 410 and fuel pump 507 are a plurality of fuel valves 505 and 506. More specifically, there is a first fuel valve 505 and second fuel valve 506—which function to help regulate the flow and velocity of the energy source 430. The underlying purpose of both fuel valves 505 and 506 is to ensure redundancy in case one valve malfunctions, becomes clogged or becomes inoperable.

A pressure regulator 510 is positioned after the fuel pump 507 to ensure the proper pressure of the energy source 430 prior to entry into the modified engine 520. The energy source 430 travels throughout both fuel valves 505 and 506, the fuel pump 507 and the pressure regulator 510 through a sixteen gauge shell, two inch fire rated insulation acoustic lined conduit 508 which includes a sixteen gauge interior body with powder coating.

Once the pressure of the power source 430 stabilizes through use of the pressure regulator 510, the fuel then enters the modified engine 520. As illustrated with reference to FIG. 6, the modified engine 520 can act as a regular combustion engine to burn the power source 430, which in turn drives one or more pistons 521 to turn a shaft 522 that rotates an alternator 523 to create electricity.

Figure 6:
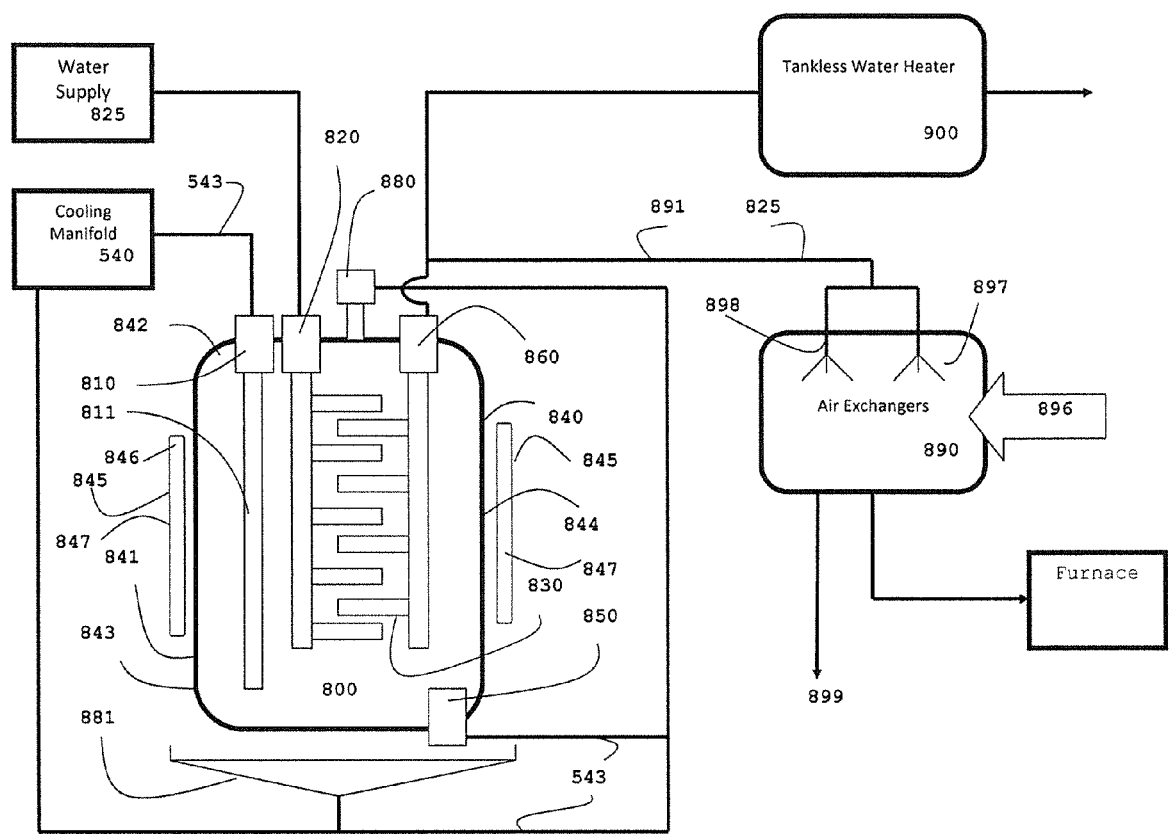
FIG. 6 illustrates the components of the heat exchange module.

With reference to FIG. 6, byproducts of the modified engine 520 include usable heat 602, as well as hot gases 603. These hot gases 603 include, but are not necessarily limited to, HC, CO, $CO_2$, $NO_x$, $SO_x$ and trace particulates (C9PM0). When leaving the modified engine 520, these hot gasses 603 have a pressure between 80 to 100 psi and a temperature between 800 to 1200 degrees Fahrenheit. These high pressure and temperature hot gasses 603 are then transported into the catalytic converter 530 for treatment.

The modified engine 520 illustrated in both FIG. 3 and FIG. 6 ensures delivery of usable electricity to not only the residential facility 300 but also the electricity grid 200. As shown in FIG. 3, this is achieved through combination of a vibration mount 524 and a harmonic distort alternator 525—both of which are attached to the modified engine 520. The vibration mount 524 is positioned below the modified engine 520 through a plurality of stabilizing legs.

The function and purpose of the vibration mount 524 is to ensure that the modified engine 520 is not only secure but also that it does not create a distinct frequency—through the turning of the various pistons 521, shaft 522, and alternator 523 (shown in greater detail in FIG. 6)—to risk degrading the quality of usable electricity flowing from the cogeneration system 500. This is because the electricity grid 200 requires a very specific and regulated electricity supply.

The uniform feed of electricity to both the facility 300 and electricity grid 200 is further aided by the harmonic distort alternator 525. As shown in FIG. 3, the harmonic distort alternator 525 is positioned directly on the modified engine 520 and prior to both the residential facility 300 and electricity grid 200. This harmonic distort alternator 525 regulates the amplification and voltage of electricity. In addition, a subsequent electricity filter 527 can be used to provide a final regulation of the electricity. A more detailed description of this system is offered in FIG. 6 described in greater detail below.

FIG. 3 also illustrates the placement, positioning and utility of the catalytic converter 530. The catalytic converter 530 functions to help ensure the proper treatment of the hot gases 603 created by combustion within the modified engine 520—in order to reduce levels of toxic byproducts being released into the atmosphere.

Overall efficiency of the catalytic converter 530 is based upon two primary chemical properties: (a) selection of the correct platinum based catalytic material, and (b) regulation of the proper temperature and pressure of the hot gases 603 when entering the catalytic converter 530. More specifically, the invention contemplates feeding the various hot gases 603 into the catalytic converter 530 at between 800 to 1000 degrees Fahrenheit and at a pressure ranging between 80 to 100 psi. The preferred catalytic material is a combination of palladium and platinum. More specifically, the preferred catalyst contemplated by the invention includes 5-30% palladium and 70-95% platinum by weight. However, other percentages are contemplated by the invention. Based upon the invention, the catalytic converter 530 is 99.99% efficient in converting the various hot gases 603 into non-toxic treated byproduct 604.

Hot gases 603 treated by the catalytic converter 530 are then transported into one or more cooling manifolds 540 and 550. As shown in both FIGS. 3 and 5, each cooling manifold 540 includes a series of heat exchangers tasked with cooling the various hot gases 603 to essentially ambient temperature. Within each manifold, cooling water 543 is supplied from an external water supply line 542 (usually the same as used by the facility 300) in a first conduit 544. This first conduit 544 encapsulates a second conduit 545 in which hot gases 603 flow through the manifold 540. Based upon the temperature gradient created between both conduits 544 and 545, the hot gases 603 are cooled while the cooling water 543 is warmed.

As shown in greater detail in FIG. 3, once the hot gases 603 are cooled, they leave the cooling manifold 530 and enter into a liquid separator 560. At this point, the hot gases 630 are at or near ambient temperature. Moreover, much of the hot gases 603 have been filtered for either removal into the atmosphere or recycled for re-treatment in the catalytic converter 520. Such hot gases 603—which are mostly light by-products—are filtered by the liquid separator 560. The liquid separator 560 creates a sufficient vacuum within the remaining hot gases 603 to remove these light-weight byproducts 604 for eventual off-gassing.

As shown in FIG. 3, it is preferred that there be at least two cooling manifolds 540 and 550 to separate and bring the hot gases 603 to ambient temperature: a first cooling manifold 540 and second cooling manifold 550. As shown, the second cooling manifold 550 feeds into a second liquid separator 565—which functions the same as the first liquid separator 560. There are two contemplated designs for the invention. First, the first cooling manifold 540 can feed into a second cooling manifold 550 to create an "in series" design. Alternatively, both cooling manifolds 540 and 540 can work in parallel—such that they both receive hot gases 603 from the catalytic converter 530 to be cooled and separated by both liquid separators 560 and 565 also in parallel.

Materials drawn from both liquid separators 560 and 565 are then placed in a separator loop 570. This loop 570 functions to circulate the various cooled by-products and allow off gassing through a vent 590. The vent 590 may be aided by a fan 580.

Control and Storage of Generated Electricity

Figure 4:
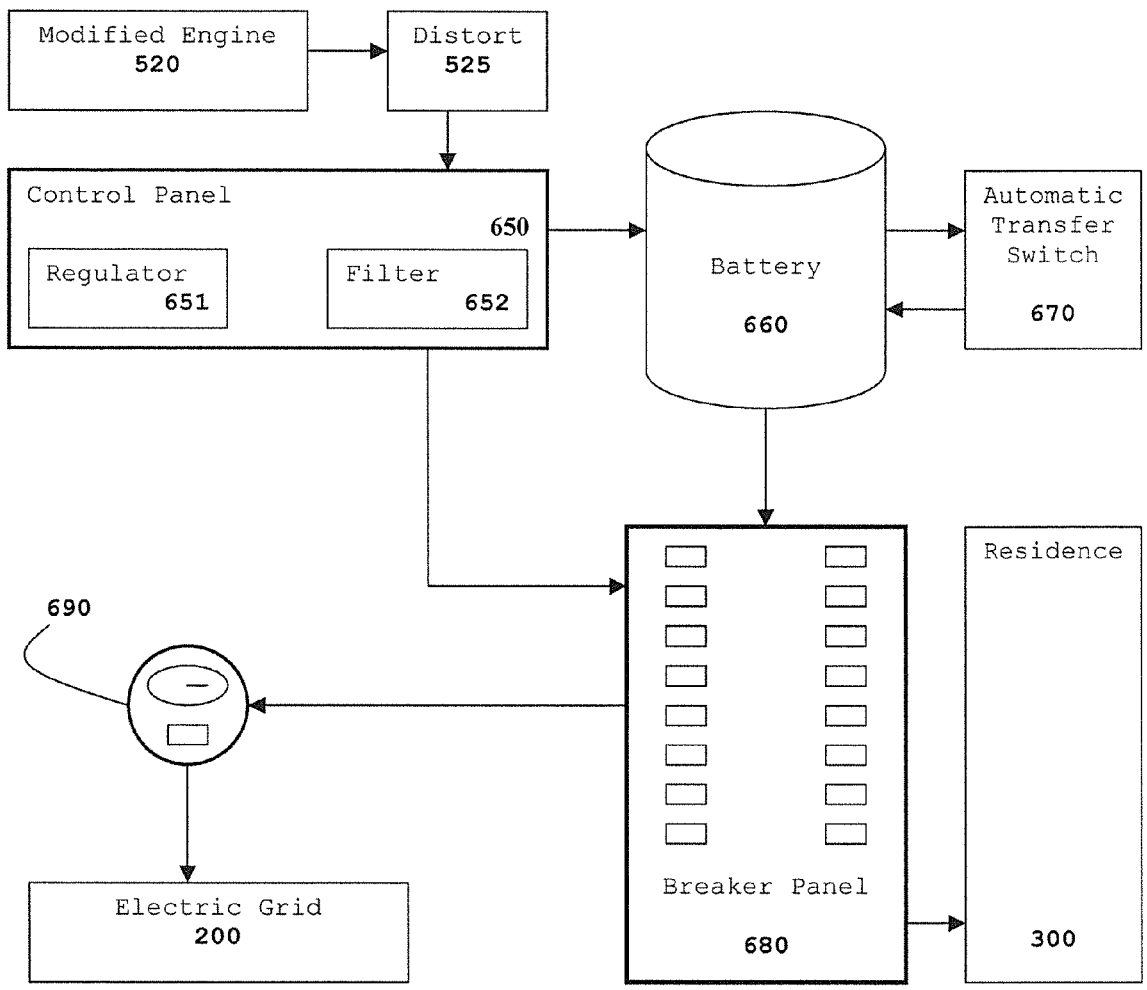
FIG. 4 is a schematic illustrating the various components of the control system, which includes a battery.

FIG. 4 illustrates, by way of example, one manner in which electricity created by the cogeneration system 500 is controlled, stored and sold back to the electricity grid 200. As shown and described in greater detail above, electricity is generated in the modified engine 520 through combustion of an energy source 430. This electricity is sent to the harmonic distort alternator 525 to ensure the current matches the consistency of electricity found in the electricity grid 200.

In the embodiment shown in FIG. 4, electricity leaves the distort alternator 525 and flows into the control panel 650. The control panel 650 includes several components to filter and regulate the incoming electricity. First, the control panel 650 includes a regulator 651 that helps purify the current of the electricity coming from the modified engine 520. Second, the control panel 650 includes a filter 652 that normalizes any noise or distortion remaining within the current.

Filtered and regulated electricity can then be directed to two receptacles: either a battery 660 (which alternatively can be an inverter) for later use or directly to the facility 300. As shown in FIG. 4, the cogeneration system 500 can include a battery 660 capable of storing electricity for later use by the facility 300. Attached to the battery is an automatic transfer switch 670. The switch 670 functions to gauge energy needs of the residential facility 300. If the home needs or anticipates greater energy use, the switch 670 ensures that electricity is drawn from the battery for use by the facility 300.

As further shown in FIG. 4, electricity can flow either from the control panel 650 or the battery 660 into the breaker panel 680 of the facility 300. The breaker panel 680 allows various appliances throughout the residential facility 300 to be supplied with electricity from the cogeneration system 500. Excess energy not needed by the breaker panel 680 to supply the energy needs of the facility 300 is then transported to the electricity grid 200. Prior to transport to the electricity grid 200, it is preferable that current flows through a meter 690 to measure the credits appropriate for the residential facility 300 to receive from the public utility.

The Cooling Manifolds

Figure 5:
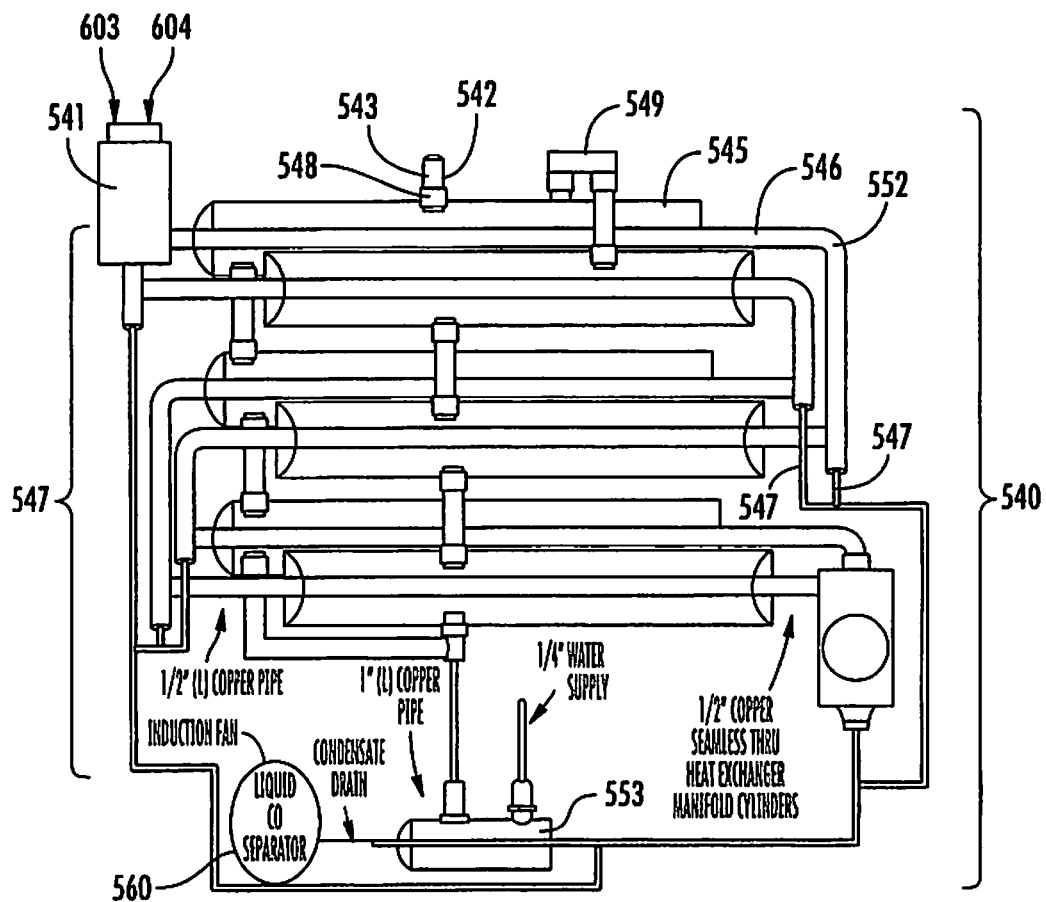
FIG. 5 is a schematic that illustrates the components of the first cooling manifold.

FIG. 5 illustrates, by way of example, the first cooling manifold 540. The preferred first cooling manifold 540 functions essentially as a heat exchanger to necessarily cool the various hot gases 603, generated from the modified engine 520, which have been treated by the catalytic converter 530. Based upon treatment, the combination of platinum and palladium within the catalytic converter 530, resulting in 99.99% conversion of these various hot gases 603 into inert and safe treated byproduct 604. The remaining non-treated hot gases 603 and treated byproduct 604 are then separated and filtered through the first cooling manifold 540 (in combination with the first liquid separator 560) through a temperature gradient effectuated by interaction with cooling water.

As illustrated in FIG. 5, the first cooling manifold 540 includes, but is not necessarily limited to, a collection chamber 541, a water supply line 542, cooling water 543, a first conduit 544, a second conduit 545, a third conduit 546, a plurality of connecting elbows 552 and a condensate drain 553. While FIG. 5 denotes six portions of the first conduit 544 in parallel relation to one another, the invention contemplates up to twenty-one such portions to ensure effective treatment and separation of the various hot gasses 603 and treated byproduct 604. Moreover, while FIG. 5 shows the various parts and functionality of the first cooling manifold 540, it is understood that these are the same primary components also found in the second cooling manifold 550.

As further shown in FIG. 5, hot gases 603 and treated byproduct 604 flow from the catalytic converter 530 into the collection chamber 541 of the first cooling manifold 540. This collection chamber 541 allows both hot gases 603 and treated byproduct 604 to be positioned for cooling via the heat exchanger 547 created within the first cooling manifold 540.

Positioned parallel to the collection chamber 541 is a heat exchanger 547 that consists of a plurality of conduits 544—546 in which the actual heat exchange takes place. The first conduit 544 is larger in both length and diameter in comparison to the second conduit 545 and the third conduit 546. Moreover, it is preferable that the first conduit 544 is of a sufficient size and dimension to encapsulate and fit over both the second conduit 545 and the third conduit 546.

The first conduit 544 includes a water intake 548 and a corresponding water discharge 549. Connected to the first conduit 544 through the water intake 548 is a water supply line 542. The water supply line 542 provides cooling water 543 to the first cooling manifold 540—typically from the municipal water supply available in the facility 300—which is at ambient temperature. However, the cooling water 543 can alternatively be any liquid capable of heat exchange. Thus, this water supply line 542 helps fill the first conduit 544 with cooling water 543 to help in the heat exchange process.

Positioned within the first conduit 544 of the heat exchanger 547 is the second conduit 545. Both hot gases 603 and treated byproduct 604 enter the second conduit 545 through the chamber collection 541. Heat exchange occurs when the warmer second conduit 545 is cooled by the surrounding cooling water 543 positioned within the first conduit 544. This heat exchange can cause portions of the gaseous treated byproduct 604 to liquefy—causing separation with the hot gases 603.

Warmed cooling water 543 is then removed and repositioned through an outlet 549 in the first conduit 544, which in turn feeds a second heat exchanger 547 positioned directly below the first heat exchanger 547. This removed warmed cooling water 543 then flows into the inlet 548 of the second heat exchanger to fill another first conduit 544. This process of removing, repositioning and re-feeding cooling water 543 can continue throughout as many heat exchangers 547 as necessary to effectuate appropriate separation.

After use within the various heat exchangers 547 positioned within the cooling manifold 540, the cooling water 543 is then removed and emptied into a heat exchange module 800 (described in greater detail below). Upon leaving the cooling manifold 540, the cooling water 543 is typically well above ambient temperature and is typically above 140 degrees Fahrenheit. Such cooling water 543 constitutes useful heat that can be used for a variety of various applications including, but certainly not limited to, assisting in heating water for use and consumption throughout the home or commercial facility.

Positioned within the second conduit 545 of each heat exchanger 547 is a third conduit 546. The third conduit 546 functions primarily to collect the various cooled and now liquefied treated byproduct 604. Positioned on the bottom of each third conduit 546 are perforations sufficient to collect liquid by product 604 cooled within the second conduit 545. Positioned at the distal end of the third conduit 546 is a connecting elbow 552. Positioned outside of both the first conduit 544 and second conduit 545, the connecting elbow 552 further effectuates liquefaction and condensing of the byproduct 604 (via air cooling) and then transports this liquid to the first liquid separator 560.

As further shown in FIG. 5, the distal end of each third conduit 546 contains a connecting elbow 552, which horizontally feeds into a centralized condensate drain 553. This condensate drain 553 functions to house and maintain all of the liquid treated byproduct 604 from the various third conduits 546 of each heat exchanger 547. This resulting byproduct 604 can then be removed from the cogeneration system 500 through a disposal—which can be part of residential facilities 300 regular sewer or septic lines (or alternatively can be vented).

Likewise, cooled hot gases 603 (which remain in the second conduit 544) are then transported to the next heat exchanger for additional cooling. This continues until the hot gases 603 reach near ambient temperature. This also helps ensure any treated byproduct 604 is properly separated for placement in the condensate drain 553. Any remaining hot gases 603 may be recycled back from the first cooling manifold 540 into the catalytic converter 530. Alternatively, these hot gases 603 may be additionally treated and cooled in a second cooling manifold 550.

Preferably, the liquid treated byproduct 604 is passed through the first liquid separator 560 shown in both FIG. 3 and FIG. 5. This liquid separator 560 includes a partial vacuum that can draw any additional undesirable light gases out of the treated byproduct 604. These gases 605 can either be retreated in the catalytic converter 540 via a recycle stream or alternatively vented from the cogeneration system 500 to a passageway outside of the residential facility 300. Once these gases 605 are extracted through the partial vacuum, the remaining treated byproduct 604 can be drained through the residential facility's 300 septic or sewer system.

The Heat Exchange Module

The invention is further directed to a heat exchange module 800 (hereinafter the "module 800"). FIG. 6 provides, by way of example, one embodiment of the module 800. As shown and illustrated, the module 800 includes six primary components (a) a first inlet 810 for injecting cooling water 543 (or any other similar cooling fluid), (b) a second inlet 820 for introducing the cold water supply 825 (typically from a municipal source), (c) contact coils 830 which function to effectuate heat exchange, (d) the insulated housing 840 which positions and maintains the contact coils 830, (e) the first outlet 850 for removing the cooling fluid 543, and (f) the second outlet 860 for removing the treated water supply 825.

As illustrated in FIG. 6, the central component of the module 800 is the insulated housing 840. The insulated housing 840 is hard, resilient, non-corrosive and watertight. Moreover, the insulated housing 840 includes an inner shell 841, which has a top side 842, a corresponding bottom side 843, and a cylindrical middle portion 844. The cylindrical middle portion 844 is located between both sides 842 and 843 and preferably includes multi-layers of insulate 845.

The insulate 845 includes a first insulate layer 846, a second insulate layer 847 and a third insulate layer 848. These three layers of insulate 845 are positioned outside the inner shell 841 which helps effectuate heat transfer, as well as maintain an above ambient temperature environment within the insulated housing 840. Moreover, the inner shell 841 is made of a lightweight and durable material such as a ceramic, composite, glass or metal. More specifically, the inner shell 841 can be of uni-body construction and formed from aluminum.

Positioned on the top side 842 of the inner shell 841 is the first inlet 810. The first inlet 810 functions to inject cooling water 543 from either cooling manifold (540 or 550) into the module 800. The first inlet 810 connects to a vertical injector 811 which introduces the now warmed cooling water 543 into the bottom of the inner shell 841. Upon residing within the inner shell 841 for a pre-specified period of time, the cooling water 543 can be removed from the insulated housing 840 through the first outlet 850. The cooling water 543—now cooled through contact with the cold water supply 825—can return to either cooling manifold (540 or 550) to help further effectuate heat exchange with the hot gases 603.

As further shown and illustrated in FIG. 6, the top end 841 of the insulated housing 840 also includes the second inlet 820. The second inlet 820 functions to introduce the cold water supply 825 into the module 800. This cold water supply 825 is typically from a municipal authority (such as a city water line) or well. More specifically, the second inlet 820 flows into a plurality of contact coils 830 positioned within the inner shell 841. While the contact coils 830 can take many a shape and form, they are preferably curved in a manner that maximizes their overall surface area—which allows greater thermal contact between the warmer cooling water 543 and the cold water supply 825. Upon treatment within the contact coils 830, the now warmed water supply 825 is removed from the module 800 and transported to a tankless water heater 900.

Prior to entry in the tankless water heater 900, the now warmed water supply 825 is well above ambient temperature. Accordingly, the heating of this warmed water supply 825 requires less energy within the tankless water heater 900 in order to supply warm water to various parts of the home or commercial facility (in comparison with traditional tankless water heaters 900 which receive water directly from a municipal source). Moreover, this efficiency is no longer dependent upon the temperature of the water supply 825 provided by a municipal authority (or outside well)—or based upon the outside weather conditions. Put another way, implementation of the module 800 allows use of the tankless water heater 900 in any geographic location—regardless of whether the home or commercial facility is in a warm weather climate.

One issue presented by the module 800 is the risk of pressure differentials. Because the cooling water 543 (positioned within the inner shell 841) transitions from hot to cold (upon heat exchange with the municipal or well based water supply 825) such cooling water 543 can have thermal expansion. Accordingly, the invention contemplates a pressure relief valve 880 positioned on the top side 542 to exhaust and remove any necessary excess cooling water 543 created through heat exchange. An emergency drain pan 881 can be positioned below the bottom side 842 of the insulated housing 840 to collect such excess cooling water 543. Alternatively, fluid received from the pressure relief valve 880 can be returned to either manifold 540 or 550.

FIG. 6 further shows how usable heat—provided in the form of heated cooling water 543—can be used to effectuate heat exchange with other components of the cogeneration system 100, such as the air and heating systems. One secondary heat exchange contemplated by the module 800 includes pre-heating air prior to introduction into the furnace of the home or commercial facility. This can be accomplished through a secondary air exchanger 890.

As shown and illustrated in FIG. 6, the secondary air exchanger 890 first includes an exchange feed 891 which draws heated cooling water 543 from the insulated housing 540. Preferably, this exchange feed 891 is located and positioned on the top side 542 of the inner shell 541. The exchange feed 891 then transports the heated water supply 825 into an air exchanger 890. The purpose and functionality of the air exchanger 890 is to allow the heated water supply 825 to heat up (warm) an incoming air feed 896 prior to entry into the furnace. This can be accomplished by either a misting system 897 or a series of micro-coils 898 (or combination of both). Upon heat exchange, the heated water supply is collected and then either (a) fed back into the module 800 through a return feed 899 or (b) alternatively recycled back to either cooling manifold (540 or 550) to be rewarmed and then returned to the module 800.

The Module Controller

Figure 7:
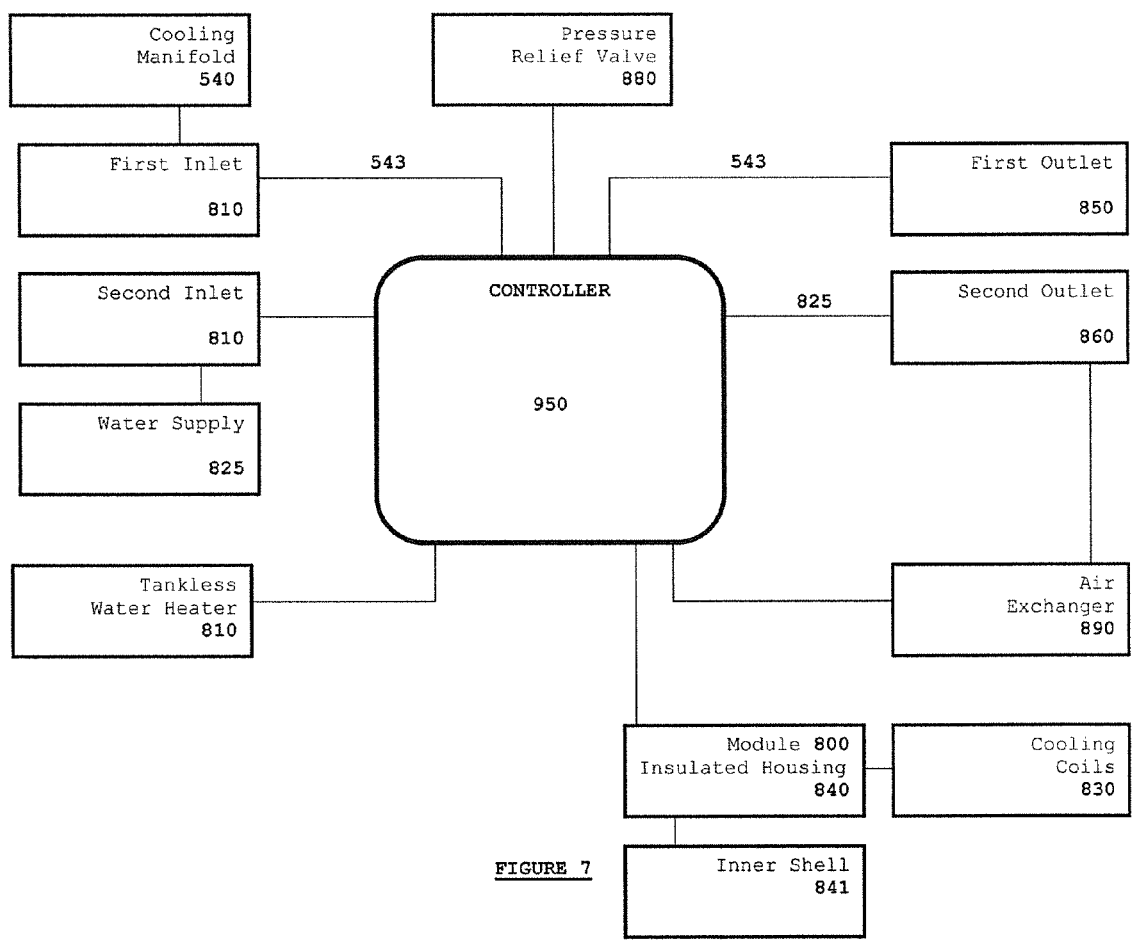
FIG. 7 is a schematic illustrating the module controller.

In addition, FIG. 7 shows how a controller 950 can be connected to the module 800, as well as its components 960 (i.e., the air exchanger 890, the first inlet 810 and the first outlet 850). The controller 950 functions to regulate and time introduction and removal of cooling water 543 throughout these components to optimize efficiency of the system. In one embodiment contemplated by the invention, the controller 950 can measure the internal temperature of the inner shell 841 and gauge whether to draw warmed cooling water 543 from the cooling manifolds (540 or 550) or stagnant cooling water 543 through the first outlet 550.

Alternatively, the controller 950 can order removal of cooling water 543 from the insulated housing 840 for purposes of introduction into the air exchanger 890 (based upon communication with the furnace). Similarly, once cooling water 543 is removed for use in the air exchanger 890, the controller 950 can determine if there is sufficient fluid within the inner shell 841 and draw more cooling water 543 from one or more manifolds (540 and 550). This helps to ensure not only that there is no stagnation of the cooling water 543 within the insulated housing 540, but also that the temperature of such cooling water 543 can effectively make thermal contact with (and warm) the cooling coils 830.

Overview of the Heater and Electrical Generator System

Figure 8:
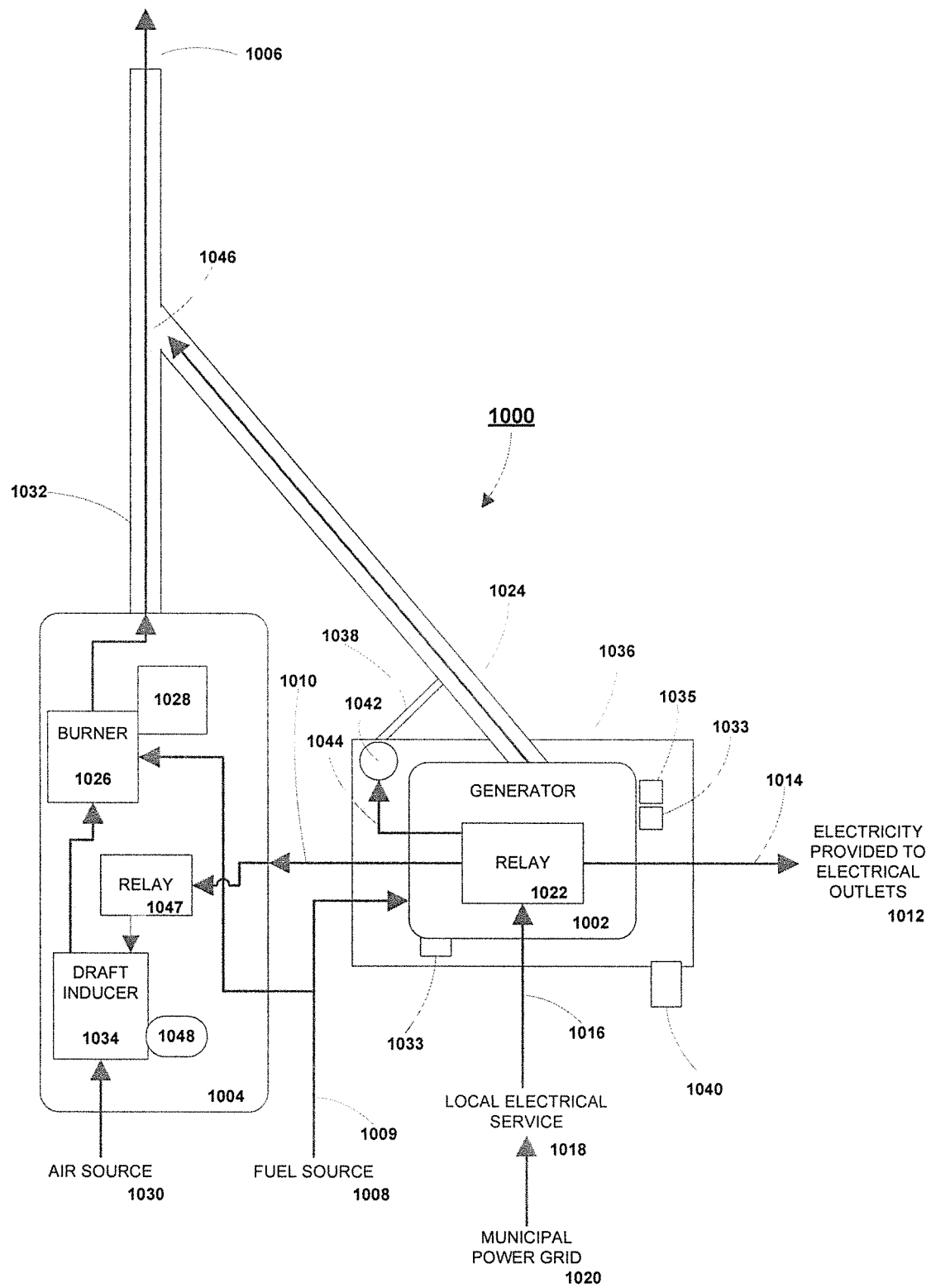
FIG. 8 is a schematic illustrating the integrated electrical generator and heating system.

Referring initially to FIG. 8, this embodiment of the invention describes an integrated heating/electrical generation system 1000 comprising an electrical generator 1002, preferably situated indoors, which is integrated with a heating apparatus 1004. In a preferred embodiment the heating apparatus 1004 is a furnace. In another embodiment, the heating apparatus 1004 is a boiler. The heating apparatus 1004 shares a common exhaust gas exit 1006 with the generator 1002.

The Heating Apparatus

FIG. 8 illustrates the flow of electricity, air, and exhaust of the system 1000, as well as illustrating the system's 1000 major components. The generator 1002, in a preferred embodiment, is a 3 kW electrical generator comprising a natural gas fuel source 1008, the fuel source reaching the generator by a fuel input line 1009. In alternate embodiments, the fuel source 1008 is at least one of propane, fuel oil, and liquefied petroleum gas. The generator 1002 serves the purpose of providing electricity to the heating apparatus 1004 through a first electrical output 1010 and to electrical outlets 1012 through a second electrical output 1014.

The generator 1002 is of a type well-known in the art, wherein a fuel-powered engine (not shown) actuates an alternator (not shown) to generate alternating current (AC) power. A control panel (not shown), also well known in the art, on the generator indicates the status of the generator 1002 utilizing at least an AC voltmeter, run timer, and circuit breakers. The control panel also comprises electrical outputs 1010, 1014 and an auto idler circuit for automatically reducing engine RPM in the absence of an electrical load.

Still referring to FIG. 8, the generator 1002 receives an electrical input 1016 from a local electrical service 1018, such that would typically be found in a facility or a commercial site. This local electrical service 1018 is a junction that receives electricity from a municipal power grid 1020. The electrical input 1016 passes to a relay 1022 in communication with the generator and the electrical outputs 1010, 1014. The relay 1022 is normally closed, so electricity into the relay 1022 passes directly through the relay to the electrical outputs 1010, 1014, thus an external electrical source, such as the municipal power grid 1020 is ultimately responsible for providing power to the heating apparatus 1004 and the electrical outlets 1012. In the case of a loss of electrical service 1018, electricity generated by the generator 1002 is provided to the relay 1022, wherein the power of the generator causes the relay 1022 to actuate so that the electricity generated by the generator is routed to the electrical outputs 1010, 1014. In a preferred embodiment, the relay 1022 actuates automatically upon generator 1002 power input, the generator 1002 automatically sensing a loss of electrical input 1016 and starting the generator 1002 engine.

In this embodiment, unlike a traditional portable or standby generators, an appliance connected directly to the generator 1002 operates under normal conditions even when the generator 1002 is powered off. The same holds true for items plugged into the outlets 1012, as these too maintain electrical current in the absence of generator 1002 power. This improvement allows for the convenience of an automatic transfer switch without the need for an automatic transfer switch, and is accomplished utilizing at least one series of normally closed relays 1022 which allow electrical current to travel through the relay 1022 to the heating apparatus 1004 and electrical outlets 1012. No energy is required to keep the relay 1022 contact in the closed position, since the relay 1022 is normally closed in a non-energized state. Therefore even upon failure of the relay 1022, electrical outlets 1012 and the heating apparatus 1004 still receive electricity. In the event of a power failure, the generator 1002 automatically powers on due to an engine start relay circuit (not shown), wherein the engine start relay is normally open when the generator receives electricity from the local electrical service 1018, but upon loss of electricity closes and causes the engine to start. When the generator 1002 is generating electricity, the relay 1022 is placed in an open state that connects electrical connections 1010, 1014 to the generator 1002 effectuating a transfer of electricity source from the local electrical service 1018 to that of the generator 1002.

The generator 1002 comprises an air intake conduit 1033 that provides air to the generator's 1002 engine. There is also an exhaust conduit 1024 in communication with the engine so that combustion gasses have a route to exit from the generator 1002.

In a preferred embodiment, the generator 1002 is enclosed by a housing 1036. The purpose of the housing 1036 is to provide for a more visually streamlined installation, and also to contain any exhaust gasses that inadvertently escape from the generator 1002. The housing 1036 comprises an emergency leak conduit 1038 in communication with the exhaust conduit 1024 for the purpose of scavenging exhaust gasses from within the housing 1036. To provide fresh air to the housing 1036, an intake port 1040 provides a path into the inside of the housing 1036 and the fresh air is used as a vehicle to aid in the exhaust of the gasses that may inadvertently escape from the generator 1002. To maintain a negative pressure to evacuate the housing 1036, a fan 1042 is in communication with the leak conduit 1038. The fan 1042 is activated when the generator is powered on by an electrical connection 1044 that provides power to the fan 1042, the connection being mediated by the relay 1022. The fan 1042, when powered on, creates a negative pressure within the housing 1036, which causes air external to the housing 1036 to enter into the housing 1036 through the intake port 1040 and then exits, along with scavenged exhaust gasses, the housing 1036 through the leak conduit 1038. When the generator 1002 is off, no power is provided to the fan 1042, for the relay is in the normally closed position. Should exhaust gas leakage occur, the leaked gas could not escape the cabinet, and would instead be drawn into the flue 1032. In a preferred embodiment, an alarm 1033 communicating with both a carbon monoxide sensor 1035 and a shut-down circuit on the generator 1002 prevents the generator 1002 from operating when exhaust gasses are detected by the carbon monoxide sensor 1035 and also provides an audible signal.

The generator 1002 generates power that is appropriate for the installation wherein the generator resides. For residential applications, the generator generates electricity that is compatible with the requirements of a household. In the United States, this would typically be 120 VAC single-phase power and 240 VAC single-phase power. In industrial settings, the generator generates at least one of single-phase and three-phase power ranging from 110 VAC to 480 VAC.

The Heating Apparatus

With continuing reference to FIG. 8, the system 1000 comprises a heating apparatus 1004 for the purpose of providing heat to an interior space. In a preferred embodiment, the heating apparatus 1004 is a natural gas furnace, such furnace types being well known in the art. In another embodiment, the heating apparatus 1004 is a boiler. In yet a different embodiment, the heating apparatus 1004 is an electric element heater. The heating apparatus 1004, in the case of a natural gas furnace, comprises a burner 1026 for burning natural gas to heat a heat exchanger 1028. The heating apparatus 1004 provides heat to an interior space utilizing intermediary fluid movement of a heat exchanger 1028, the heat exchanger 1028 utilizing at least one of air, steam, and water to mediate heating. The heating apparatus 1004 utilizes a combustible fuel to generate a flame in the burner 1026 that heats the heat exchanger 1028, the fuel being at least one of natural gas, liquefied petroleum gas, fuel oil, coal, and wood. In a preferred embodiment, the fuel is delivered from the fuel source 1008 through the fuel input line 1009 to the burner 1026.

To ensure an adequate influx of air for combustion from the air source 1030, the heating apparatus 1004 comprises a draft inducer 1034. The draft inducer 1034 is a device well known in the art comprising an electric fan to create a positive draft that aids in the proper exhaust of combustion gasses. The draft inducer 1034 is in communication with the flue 1032, and is proximate the burner 1026. In a preferred embodiment, the draft inducer 1034 promotes exhaust of combustion gasses and also promotes the influx of air from an air source 1030 for combustion.

The burner 1026 of the heating apparatus 1004 requires a source of air 1030 that provides the air required for the combustion process. Additionally, a flue 1032 is in communication with the burner 1026 that allows the heating apparatus 1004 to exhaust combustion gasses from the heating apparatus 1004 through the exhaust gas exit 1006 of the system 1000. The flue 1032 is a conduit constructed of heat-resistant material that provides a point where exhaust gasses may be safely disbursed, which is typically to a point outside the structure being heated. The flue 1032 is constructed from polyvinyl chloride (PVC), metal, vitreous enamel, or transite.

Heating Apparatus and Generator Interaction

With continuing reference to FIG. 8, the generator 1002 is installed in close proximity with the heating apparatus 1004, since both of these units 1002, 1004 utilize common electrical service 1016, fuel source 1008, and exhaust gas exit 1006.

The flue 1032 of the heating apparatus 1004 is in communication with the exhaust conduit 1024 of the generator 1002 at a Y-junction 1046. Therefore, the heating apparatus 1004 shares a common exhaust gas exit 1006 with the generator 1002. The emergency leak conduit 1038 in communication with the exhaust conduit 1024 is therefore also in communication with the common exhaust gas exit 1006. In a preferred embodiment, the flue 1032, exhaust conduit 1024, and the Y-junction 1046 are made of polyvinyl chloride pipe.

The power for the electrical outlets 1012 and the heating apparatus 1004 are relayed through a relay 1022 associated with the generator 1002, thus a single input source of electrical service 1018 powers the electrical outlets 1012 wherein the generator 1002 is installed and provides power to the heating apparatus 1004. When electrical service 1018 is not provided, the same electrical connections 1010, 1014 are utilized for electricity delivery to electrical outlets 1012 and the heating apparatus 1004, yet the generator 1002 provides the electricity in that case.

When the generator 1002 is powered on, electricity is provided by the generator 1002 to actuate an exhaust gas relay 1047, which provides power to the draft inducer 1034. The draft inducer 1034 is activated to expel the generator's exhaust through the common exhaust gas exit 1006 even if the furnace is not producing heat. The draft inducer 1034 also induces the evacuation of the generator's 1002 housing 1036. In one embodiment, the draft inducer 1034 is installed before the burner 1026, and in another embodiment, the draft inducer 1034 is installed after the junction of the Y-pipe 1046.

A pressure switch 1048 communicates with the heating apparatus proximate the flue 1032, the draft inducer 1034, and also communicates electrically with the generator 1002. In a preferred embodiment, the pressure switch 1048 is a diaphragm type switch well known in the art wherein the switch monitors the relative pressure within the flue 1032 compared to the ambient pressure, detecting when the draft inducer 1034 is functioning. If the draft inducer 1034 is not functioning, the pressure switch 1048 detects the lack of a lower pressure in the flue 1032 and sends an electrical signal to the generator 1002, disabling the generator 1002 for safety purposes.

The fuel source 1008 in a preferred embodiment of the invention is shared, so that a common fuel line 1009 is utilized by both the generator 1002 and the heating apparatus 1004.

FIG. 8 exemplifies that the generator 1002 shares electrical service 1018, fuel source 1008, and an exhaust gas exit 1006, so the installation of a generator to work in conjunction with a home's existing heating apparatus is a relatively simple installation. Specifically, the generator 1002 utilizes the existing furnace or boiler's induction system (collectively 1030, 1034, 1032, 1006) to form a vacuum to extract the emissions from the generator 1002. The generator communicates with the heating apparatus exhaust gas relay 1047 which controls and energizes the heating system's induction fan to evacuate both generator 1002 and heating apparatus 1004 exhaust gases to the outdoors. The generator's 1002 exhaust conduit 1024 contacts the heating apparatus 1004 flue 1032 and this is accomplished using a Y-fitting 1046 that is easily integrated into an existing flue 1032 installation. The pressure switch 1048 may be installed in the system at the same time as the Y-fitting 1046. By sharing existing fuel and exhaust lines, this installation scheme drastically reduces labor and material cost. This indoor generator 1002 system 1000 also reduces or eliminates the chances of harmful escaping emissions.

Figure 9:
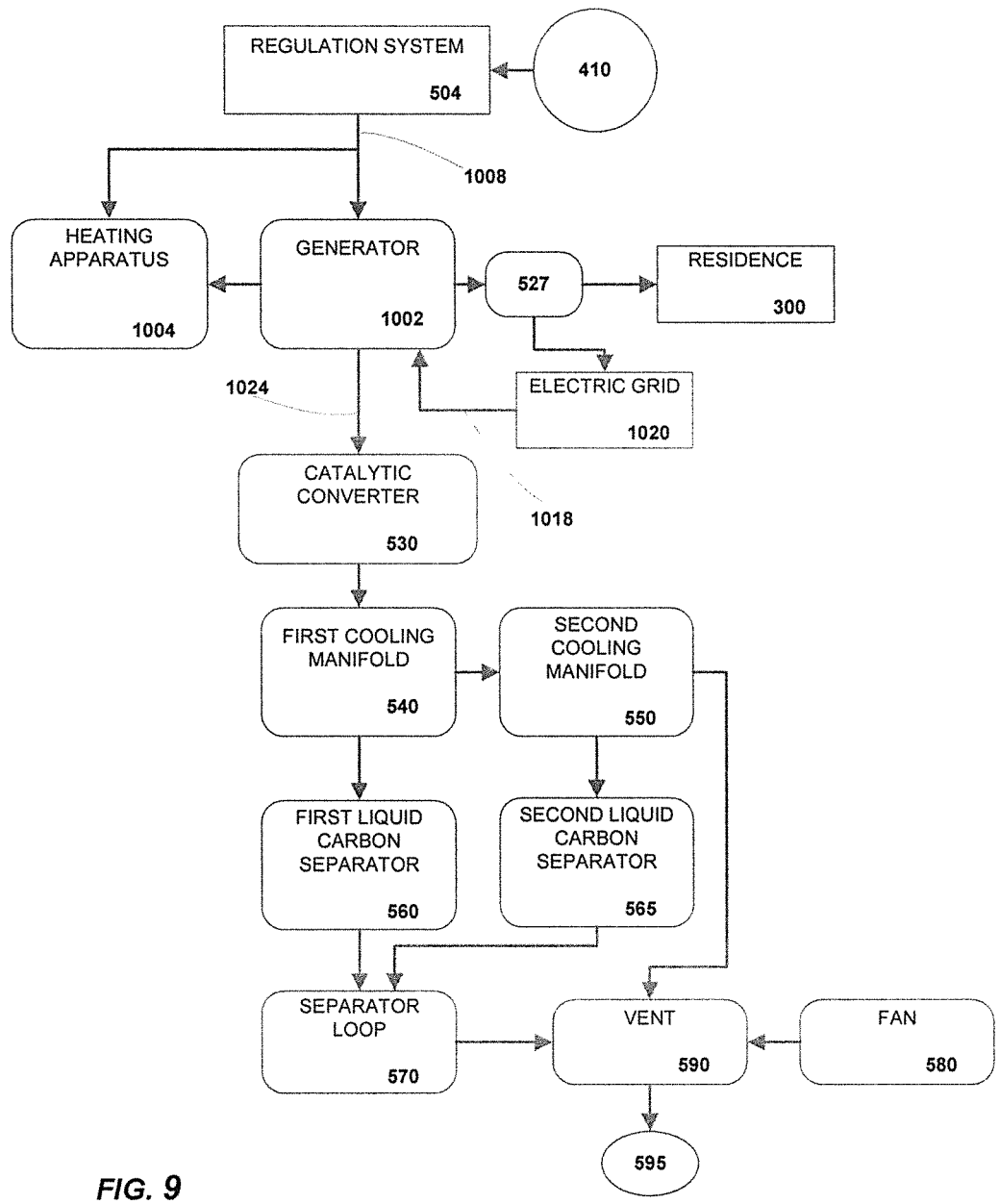
FIG. 9 is a schematic illustrating a heat exchange module for employing usable heat created by a cogeneration system coupled to a generator.

FIG. 9 illustrates how the generator 1002 can be incorporated into the cogeneration system 500 (FIGS. 1, 2) described herein. In this embodiment, the generator 1002 provides power for a facility 300 and the electrical grid 1020, yet the generator's exhaust is fed into a catalytic converter 530 and cooling manifolds 540, 550 as part of the cogeneration system 500 scheme. The generator 1002 is in communication with a heating apparatus 1004 and shares a common fuel source 1008 and electrical service 1018 with the heating apparatus 1004. The primary difference the configuration of the generator 1002 in this embodiment of the invention illustrated in FIG. 9, as compared to the combination generator/heating apparatus system 1000 illustrated by FIG. 8, is that the exhaust from the generator is not merely exhausted, but rather harnessed in at least one cooling manifold 540, 550.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An integrated electrical generator and heating system comprising:
    a heating apparatus comprising a fuel burner that produces heat, a heat exchanger that is heated by the burner, a draft inducer to promote an influx of combustion air and exhausting of exhaust gas created by the burner, a flue in communication with the draft inducer, wherein the flue is a path for the heating apparatus exhaust gas to escape from the system, and a heater fuel input line in communication with the burner to provide fuel to the burner;
    a fuel-powered electrical generator comprising an electrical input, a first electrical output, a generator fuel input line, an air intake conduit, and an exhaust conduit, the generator accepting electrical service from an electrical power grid through the electrical input, the generator delivering electricity to the heating apparatus through the first electrical output, the generator accepting air required for combustion through the intake conduit and exhausting combustion exhaust gas through the exhaust conduit, wherein the exhaust conduit of the generator communicates with the flue of the heating apparatus;
    at least one normally closed relay that communicates electrical service from the power grid to the first electrical output when the generator is powered off, wherein the relay communicates electricity generated by the generator to the first electrical output when the generator is powered on; and
    an electrical exhaust gas relay activated by the generator when the generator is generating power, wherein the exhaust gas relay signals the draft inducer to activate, the draft inducer generating a vacuum that evacuates at least one of generator exhaust gas and heating apparatus exhaust gas from the system.

2. The system of claim 1, wherein the heating apparatus provides heat through intermediary fluid movement, the fluids chosen from the group consisting of air, steam, and water.

3. The system of claim 1, wherein the heating apparatus utilizes a fuel to generate heat, the fuel chosen from the group consisting of natural gas, liquefied petroleum gas, fuel oil, coal, and wood.

4. An integrated electrical generator and heating system comprising a backup electrical generator in communication with a heater, wherein the generator and heater share fossil fuel input, share exhaust output, share one or more draft inducers, and the generator automatically provides electricity to the heater and a facility wherein the generator is installed upon loss of an external source of electricity.

5. The system of claim 4, further comprising:
    a second electrical output in communication with at least one electrical power receptacle; and
    at least one normally closed relay that communicates electrical service from the power grid to the second electrical output when the generator is powered off, wherein the relay communicates electricity generated by the generator to the second electrical output when the generator is powered on.

6. The system of claim 4, further comprising:
    a housing that encases the generator having an emergency leak conduit in communication with the exhaust conduit of the generator;
    at least one intake port on the housing; and
    at least one fan proximate the leak conduit port, the fan being activated when the generator is powered on to create a negative pressure within the housing causing air external to the housing to enter into the housing through the intake port.

7. The system of claim 4, further comprising:
    a pressure switch in communication with the heating apparatus proximate the flue and also in communication with the generator, wherein the pressure switch detects a negative pressure induced by the draft inducer and disables the generator when the draft inducer is not functional.

8. The system of claim 4, wherein fuel to power the heating apparatus is of the same type of fuel to power the generator, and the heater fuel input line communicates with the generator fuel input line and both the heating apparatus and generator share a common source of fuel.

9. The system of claim 4, wherein the generator generates at least one of 120 VAC single-phase power, 240 VAC single-phase power, 240 VAC three-phase power, and 480 VAC three-phase power.

10. The system of claim 4, wherein the flue is made from a material chosen from the group consisting of polyvinyl chloride, metal, vitreous enamel, and transite.

11. The system of claim 4, wherein the heating apparatus is at least one of a furnace, boiler, and electric element heater.

12. The system of claim 4, wherein the generator utilizes a fuel to generate electricity, the fuel chosen from the group consisting of natural gas, liquefied petroleum gas, fuel oil, coal, and wood.

13. The system of claim 4, wherein the exhaust conduit of the generator communicates with the flue of the heating apparatus using a Y-pipe.

14. A heat exchange module for employing usable heat created by a cogeneration system comprising:
    a heating apparatus for the purpose of providing heat to an interior space comprising a fuel burner that produces heat, a heat exchanger that is heated by the burner, a draft inducer to promote an influx of combustion air and exhausting of exhaust gas created by the burner, a flue in communication with the draft inducer, wherein the flue is a path for the heating apparatus exhaust gas to escape from the system, and a heater fuel input line in communication with the burner to provide fuel to the burner;
    a fuel-powered electrical generator comprising an electrical input, a first electrical output, a generator fuel input line, an air intake conduit, and an exhaust conduit, the generator accepting electrical service from an electrical power grid through the electrical input, the generator delivering electricity to the heating apparatus through the first electrical output, the generator accepting air required for combustion through the intake conduit and exhausting combustion exhaust gas through the exhaust conduit;

at least one normally closed relay that communicates electrical service from the power grid to the first electrical output when the generator is powered off, wherein the relay communicates electricity generated by the generator to the first electrical output when the generator is powered on; and an electrical exhaust gas relay activated by the generator when the generator is generating power, wherein the exhaust gas relay signals the draft inducer to activate, the draft inducer generating a vacuum that evacuates at least one of generator exhaust gas and heating apparatus exhaust gas from the system; and a second heat exchanger having a collection chamber and at least one heat exchange conduit, the collection chamber capturing the generator's exhaust gas for the purpose of heating at least one heat exchange conduit, the heat exchange conduit containing water that is heated by the heat exchange conduit.

15. The module of claim 3, wherein the heated water in the heat exchange conduit is used as water for at least one of a water heater and a radiant heating system.

16. The module of claim 3, further comprising:
a housing that encases the generator having an emergency leak conduit in communication with the exhaust conduit of the generator;
at least one intake port on the housing; and
at least one fan proximate the leak conduit port, the fan being activated when the generator is powered on to create a negative pressure within the housing causing air external to the housing to enter into the housing through the intake port.

17. The module of claim 3, wherein fuel to power the heating apparatus is of the same type of fuel to power the generator, and the heater fuel input line communicates with the generator fuel input line and both the heating apparatus and generator share a common source of fuel.

18. The module of claim 3, wherein the generator generates at least one of 120 VAC single-phase power, 240 VAC single-phase power, 240 VAC three-phase power, and 480 VAC three-phase power.

19. The module of claim 3, wherein the flue is made from a material chosen from the group consisting of polyvinyl chloride, metal, vitreous enamel, and transite.

20. The module of claim 3, wherein the heating apparatus is at least one of a furnace, boiler, and electric element heater.

21. The module of claim 3, wherein the generator utilizes a fuel to generate electricity, the fuel chosen from the group consisting of natural gas, liquefied petroleum gas, fuel oil, coal, and wood.

* * * * *